Jan. 3, 1933.   I. T. STOKES ET AL   1,893,253
ELECTRIC HEATING OR COOKING APPARATUS FOR FOOD
Filed Jan. 27, 1931

Inventors.
I. T. Stokes.
A. G. Ionides.
By Blair & Kilcoyne
Attys

Patented Jan. 3, 1933

1,893,253

UNITED STATES PATENT OFFICE

IRENE THEODORA STOKES, OF RIPLEY, AND ALEXANDER GEORGE IONIDES, OF DUNSTABLE, ENGLAND

ELECTRIC HEATING OR COOKING APPARATUS FOR FOOD

Application filed January 27, 1931, Serial No. 511,600, and in Great Britain January 2, 1931.

This invention relates to electric heating and cooking apparatus for food and has for its object to provide an improved heating or cooking apparatus of the kind comprising a metal cover adapted to be placed over a plate or dish on which is the food to be heated or cooked, and an electric heating element within the cover adapted to derive current from an external source of power.

In electric heating or cooking apparatus of the above kind according to the present invention, the electric heating element within the cover comprises a disc of ceramic or other heat-resisting electrical insulating material having inner and outer flanges extending from one face thereof and resistance heating wire extending across the space between and supported by the flanges. Preferably a disc-like protecting metal grid extends over the open end of the space enclosed by the outer flange, this grid bearing on the free edges of the flanges and conveniently being maintained in position by a central bolt passing through the centre of the grid and the disc of heat-resisting electric insulating material. This bolt may also pass through the upper wall of the metal cover and may have an earthing wire connected to it so as to connect the bolt, the protecting grid and the cover to earth when the apparatus is in use and thus reduce the risk of an operator receiving an electric shock.

The upper wall of the cover is preferably substantially flat while the side wall is substantially cylindrical, a socket for a handle being secured to the side wall and tapered and screwthreaded internally. The end of the handle which fits into the socket is unprovided with a screwthread but adapted to fit within the socket and to be drawn into and jammed in this socket by the screwthread when the handle is rotated. The handle is conveniently made hollow and the conductors for leading current to the electric heating element and the earthing wire, where such is provided, pass through the socket and handle.

Figure 1:
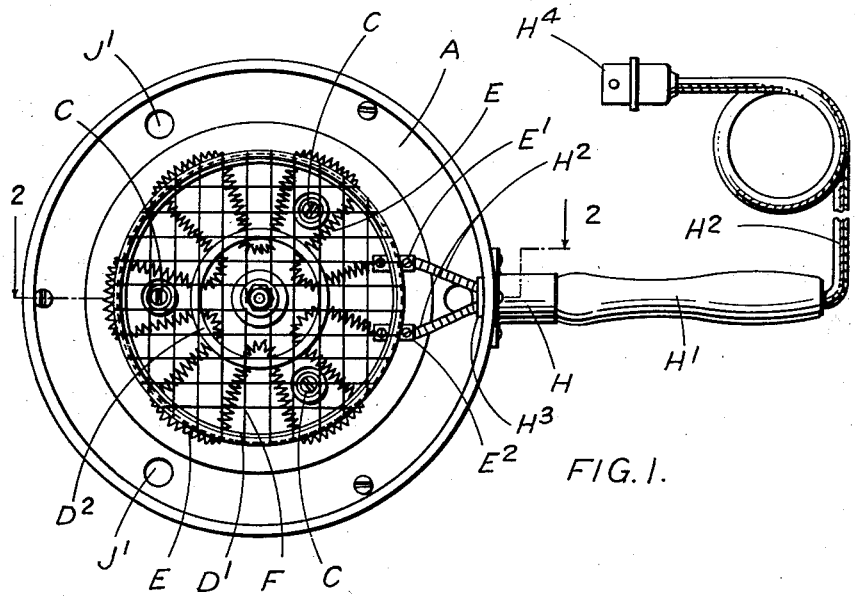
Figure 2:
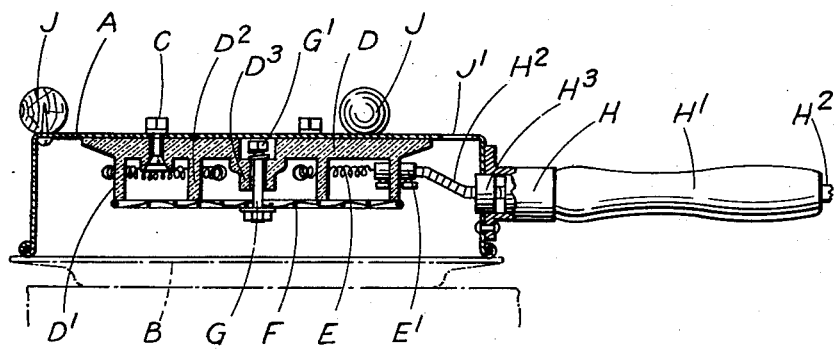
Figure 3:
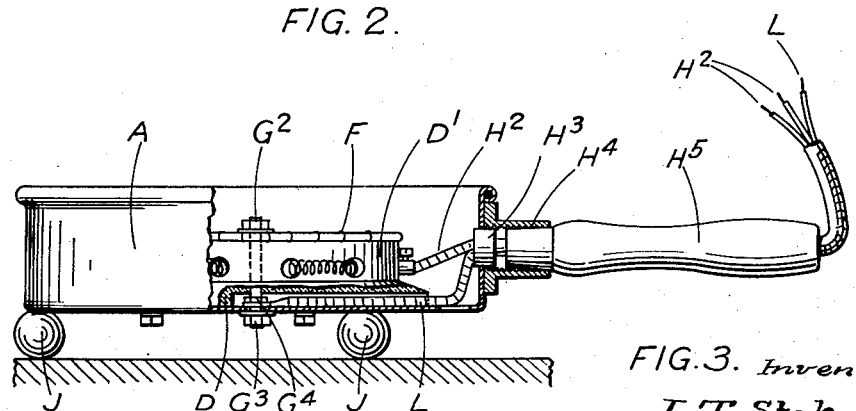

The invention may be carried into practice in various ways but one construction according to this invention together with a modification thereof are illustrated by way of example in the accompanying drawing, in which Figure 1 is an inverted plan of one construction, Figure 2 is a section on the line 2—2 of Figure 1 with the apparatus in its normal cooking or heating position, and Figure 3 is a side elevation partly in section of a modified construction, the cooking apparatus being shown in its inverted position, that is to say with the open face of the cover upwards.

In the construction illustrated in Figures 1 and 2, the apparatus comprises a cover A adapted to fit over a plate of normal size as indicated at B in Figure 2. The upper wall of the cover is as shown substantially flat while its side wall is substantially cylindrical.

Secured to the upper wall of the cover by three bolts C is an electric heating element comprising a disc D of ceramic or like heat-resisting insulating material having formed integral therewith and projecting from the lower face thereof two concentric flanges $D^1$, $D^2$. Each of these flanges is provided with a series of radial perforations and coiled resistance heating wire $D^3$ is threaded through these perforations as shown in Figure 1 so that this wire extends across the space between and is supported by the flanges. The ends of the resistance heating wire are connected respectively to two terminals $E^1$, $E^2$ mounted in two of the perforations in the outer flange. Enclosing the space in which lies the resistance heating wire E is a protecting metal grid F which bears on the free edges of the flanges $D^1$, $D^2$ and is secured in position by a bolt G passing through the protecting metal grid and through a bore in a central boss $D^3$ on the disc D, a recess being provided in the disc to accommodate a nut $G^1$ on the end of the bolt G.

Mounted on the lateral wall of the cover A is a handle socket H in which is secured the end of a hollow handle $H^1$ of wood or the like through which pass electric conductors $H^2$. The inner ends of these conductors pass also through two holes in a wooden or like insulating plug $H^3$ as shown and are connected respectively to the two terminals $E^1$, $E^2$, while the outer ends of the conductors, which are conveniently formed as a single duplex cable, are coupled to one half H⁴ of a plug and socket connection whereby the apparatus can be connected to a source of electric power. Three wooden or like heat insulating knobs or feet J are secured to the upper face of the upper wall of the cover A to support the apparatus when it is inverted, while three perforations J¹ are formed in the upper wall of the cover.

The apparatus shown in Figure 3 is illustrated in its inverted position and is similar to that illustrated in Figures 1 and 2 except that a central bolt G² for holding the protecting grid F in position passes not only through a hollow boss in the disc D but also through the wall of the cover A. This bolt G² is provided with a nut G³ on the outside of the cover and also with a nut G⁴ to which is coupled the end of an earthing conductor L which also passes through the wood or like plug H³ and through the handle. In this construction the handle socket H⁴ is formed tapered and screwthreaded internally while the inner end of the hollow handle H⁵ is correspondingly tapered but not provided with a screwthread, the arrangement being such that if the end of the handle is inserted into the socket and then rotated, the screwthread will tend to draw the handle into and jam it in the socket H⁴.

It will be seen that in the construction shown in Figure 3 the protecting metal grid F, the bolt G² and metal cover A will be connected to earth by the earthing conductor L when the apparatus is in use, thus reducing the risk of an operator receiving a shock due to the current-carrying wires inadvertently coming into contact with some metal part of the apparatus.

What we claim as our invention and desire to secure by Letters Patent is:—

1. Electric heating apparatus for food including, in combination, a metal cover adapted to be placed over the food to be heated, an electric heating element within the cover comprising a disc of heat-resisting electric-insulating material, inner and outer flanges formed integral with and extending from one face of said disc, an exposed resistance heating wire extending backwards and forwards across the space between and supported by the flanges, and means for connecting the resistance heating wire to a source of current supply.

2. Electric heating apparatus for food including, in combination, a heating element comprising a disc of heat-resisting electric-insulating material, two concentric flanges formed integral with and extending from one face thereof, an exposed resistance heating wire extending backwards and forwards across the space between and supported by the flanges, a metal grid bearing on the free edges of the flanges so as to close in the space between these flanges, and means for retaining the metal grid in position.

3. Electric heating apparatus for food including, in combination, a metal cover adapted to be placed over the food to be heated, an electric heating element within the cover comprising a disc of heat-resisting electric-insulating material, concentric inner and outer flanges formed integral with and extending from one face of said disc, an exposed resistance heating wire extending backwards and forwards across the space between and supported by the flanges, means for connecting the resistance heating wire to a source of current supply, a disc-like metal grid bearing on the free edges of the flanges so as to close in the space between these flanges, and means for retaining the disc-like metal grid in position.

4. Electric heating apparatus for food, including, in combination, a heating element comprising a disc of heat-resisting electric-insulating material, inner and outer flanges formed integral with and extending from one face thereof, an exposed resistance heating wire extending backwards and forwards across the space between and supported by the flanges, and electric terminals for the heating wire supported by the outer flange.

5. Electric heating apparatus for food including, in combination, a metal cover adapted to be placed over the food to be heated, an electric heating element within the cover comprising a disc of heat-resisting electric-insulating material, inner and outer flanges formed integral with and extending from one face of this disc, an exposed resistance heating wire extending across the space between and supported by the flanges, terminals for the resistance heating wire in the outer flange, a disc-like grid of metal bearing on the free edges of the flanges so as to close in the space between these flanges, means for retaining the metal grid in place, means for supplying current to the terminals, and a laterally extending handle mounted on the metal cover.

6. Electric heating apparatus for food including, in combination, a metal cover adapted to be placed over the food to be heated, an electric heating element within the cover comprising a disc of heat-resisting electric-insulating material, inner and outer flanges formed integral with and extending from one face of this disc, an exposed resistance heating wire extending across the space between and supported by the flanges, a disc-like grid of metal bearing on the free edges of the flanges so as to close in the space between these flanges, means for retaining the metal grid in place, a laterally extending handle on the cover, and electric conductors passing through the handle and connected at their inner ends to the terminals in the outer flange.

7. For use with electric heating apparatus for food, a heating element comprising a disc of heat-resisting electric insulating material, two concentric flanges extending from one face thereof and resistance heating wire extending across the space between and supported by the flanges, a metal grid bearing on the free edges of the flanges so as to close in the space between these flanges, and a central bolt passing through the grid and the disc of heat-resisting electric insulating material and serving to maintain the protecting grid in position.

8. Electric heating apparatus for food, including in combination a metal cover having a flat end wall and a substantially cylindrical side wall, a heating element mounted within the cover and comprising a disc of heat-resisting electric insulating material, concentric flanges extending from one face of the disc and resistance heating wire extending across the space between and supported by the flanges, electric terminals for the heating wire supported by the outer flange, bolts securing the heating element to the upper wall of the cover, a metal grid bearing on the free edges of the flanges so as to enclose the space between these flanges, a central bolt passing through this metal grid and the disc of heat-resisting electric insulating material so as to retain the grid in position, a handle socket on the side wall of the cover, a laterally extending handle engaging this socket, and electric conductors passing through the handle and socket and connected to the terminals in the outer flange of the heating element.

9. Electric heating apparatus for food, including in combination a metal cover having a flat end wall and a substantially cylindrical side wall, a heating element mounted within the cover and comprising a disc of heat-resisting electric insulating material, concentric flanges extending from one face of the disc and resistance heating wire extending across the space between and supported by the flanges, electric terminals for the heating wire supported by the outer flange, bolts securing the heating element o the end wall of the cover, a metal protecting grid bearing on the free edges of the flanges so as to enclose the space between these flanges, a central bolt passing through this metal grid and the disc of heat-resisting electric insulating material so as to retain the grid in position, a handle socket on the side wall of the cover, a laterally extending handle engaging this socket, two electric conductors passing through the handle and socket and connected respectively to the two terminals in the outer flange of the heating element, and an earthing conductor also passing through the handle and socket and connected to the central bolt which retains the metal protecting grid in position.

10. Electric heating apparatus for food, including in combination a metal cover having a flat end wall and a substantially cylindrical side wall, a heating element mounted within the cover and comprising a disc of heat-resisting electric insulating material, concentric flanges extending from one face of the disc and resistance heating wire extending across the space between and supported by the flanges, electric terminals for the heating wire supported by the outer flange, bolts securing the heating element to the end wall of the cover, a metal protecting grid bearing on the free edges of the flanges so as to enclose the space between these flanges, a central bolt passing through the protecting grid, the disc of heat-resisting electric insulating material and the end wall of the cover and serving to maintain the protecting grid in position, a handle socket on the side wall of the cover, a laterally extending handle engaging this socket, and two electric conductors passing through the handle and socket and connected respectively to the two terminals in the outer flange of the heating element, and an earthing conductor also passing through the handle and socket and connected to the central bolt which retains the metal protecting grid in position.

In testimony whereof we have signed our names to this specification.

IRENE THEODORA STOKES.
ALEXANDER GEORGE IONIDES.